US009069079B2

United States Patent
Tsuji et al.

(10) Patent No.: US 9,069,079 B2
(45) Date of Patent: Jun. 30, 2015

(54) OBSTACLE DETECTION SYSTEM WITH ULTRASONIC SENSORS LOCATED AT EITHER SIDE OF A BUMPER, HAVING OWN BEAM AXES AT AN ANGLE DEFLECTED IN A HORIZONTAL DIRECTION FROM A SURFACE-NORMAL DIRECTION OF THE BUMPER

(75) Inventors: Takashi Tsuji, Mie (JP); Naoya Azuma, Mie (JP); Yasushi Nagano, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 295 days.

(21) Appl. No.: 13/641,312

(22) PCT Filed: Apr. 15, 2010

(86) PCT No.: PCT/JP2010/056757
§ 371 (c)(1),
(2), (4) Date: Oct. 15, 2012

(87) PCT Pub. No.: WO2011/129001
PCT Pub. Date: Oct. 20, 2011

(65) Prior Publication Data
US 2013/0028053 A1   Jan. 31, 2013

(51) Int. Cl.
| G08B 21/00 | (2006.01) |
| G01S 15/93 | (2006.01) |
| G01S 7/521 | (2006.01) |
| B60R 19/48 | (2006.01) |

(52) U.S. Cl.
CPC .............. *G01S 15/931* (2013.01); *G01S 7/521* (2013.01); *G01S 2015/938* (2013.01); *B60R 19/483* (2013.01)

(58) Field of Classification Search
CPC .......... G01S 13/931; G01S 2013/9353; G01S 2013/9364
USPC .............................. 340/435–438, 988; 367/93
See application file for complete search history.

(56) References Cited

U.S. PATENT DOCUMENTS

| 6,281,786 B1 * | 8/2001 | Adachi et al. ................. 340/435 |
| 6,433,679 B1 * | 8/2002 | Schmid ........................ 340/435 |

(Continued)

FOREIGN PATENT DOCUMENTS

| GB | 2112520 A | 7/1983 |
| JP | 50-597 Y1 | 1/1975 |
| JP | 57-182187 A | 11/1982 |

(Continued)

OTHER PUBLICATIONS

International Search Report mailed May 18, 2010 issued in corresponding International Application No. PCT/JP2010/056757.

(Continued)

*Primary Examiner* — Mark Rushing
(74) *Attorney, Agent, or Firm* — McDermott Will & Emery LLP

(57) ABSTRACT

An obstacle detection system includes ultrasonic sensors and a controller. The ultrasonic sensors include first and second ultrasonic sensors. Each of them is located at either side of a vehicle bumper so that its own beam axis has an angle deflected in a horizontal direction from a surface-normal direction of the bumper and is directed towards an intermediate portion of the bumper.

15 Claims, 4 Drawing Sheets

(56) References Cited

U.S. PATENT DOCUMENTS

2002/0130770 A1* 9/2002 Keyworth et al. ............ 340/436
2010/0245065 A1* 9/2010 Harada et al. ................. 340/435

FOREIGN PATENT DOCUMENTS

| | | |
|---|---|---|
| JP | 62-220890 A | 9/1987 |
| JP | 62-266481 A | 11/1987 |
| JP | 64-044879 U | 2/1989 |
| JP | 03-096890 A | 4/1991 |
| JP | 03-110490 A | 5/1991 |
| JP | 11-304920 A | 11/1999 |
| JP | 2001-208843 A | 8/2001 |

OTHER PUBLICATIONS

Extended European Search Report issued in European Application No. 10849838.7—1812 dated Apr. 2, 2014.

* cited by examiner

OBSTACLE DETECTION SYSTEM WITH ULTRASONIC SENSORS LOCATED AT EITHER SIDE OF A BUMPER, HAVING OWN BEAM AXES AT AN ANGLE DEFLECTED IN A HORIZONTAL DIRECTION FROM A SURFACE-NORMAL DIRECTION OF THE BUMPER

RELATED APPLICATIONS

This application is the U.S. National Phase under 35 U.S.C. §371 of International Application No. PCT/JP2010/056757, filed on Apr. 15, 2010, the disclosure of which Application is incorporated by reference herein.

TECHNICAL FIELD

The invention relates generally to obstacle detection systems and, more particularly, to an obstacle detection system configured to judge whether or not an obstacle is present in a detection area based on incoming ultrasonic waves obtained by emitting ultrasonic waves.

BACKGROUND ART

For example, Japanese Patent Application Number P2001-208843 A published on Aug. 3, 2001 discloses an obstacle detection system that includes four ultrasonic sensors and a controller. Each ultrasonic sensor includes a microphone, a transmission circuit, an attenuator circuit and an amplifier circuit. The microphone is configured to emit and receive ultrasonic waves. The transmission circuit is configured to drive the microphone in accordance with control of the controller. The attenuator and amplifier circuits are configured to adjust a level of a signal obtained from incoming ultrasonic waves.

The obstacle detection system is configured so that one ultrasonic sensor of a plurality of (four) ultrasonic sensors emits ultrasonic waves and other ultrasonic sensor then receives incoming ultrasonic waves obtained from the ultrasonic waves. This leads to expand a maximum detection area covered with the plurality of ultrasonic sensors.

The obstacle detection system is also configured to adjust a level of a signal obtained from incoming ultrasonic waves so that a detection area is changed to a short distance area or a long distance area and a beam angle for the long distance area (especially, a vertical beam angle) is smaller than a beam angle for the short distance area. This leads to prevent a false detection caused by a small projection of a road surface, or the like.

The obstacle detection system however requires that the four ultrasonic sensors be mounted on a bumper fixed to a vehicle, for example, at 50 cm intervals.

DISCLOSURE OF THE INVENTION

It is an object of the present invention to decrease the number of ultrasonic sensors.

An obstacle detection system of the present invention comprises ultrasonic sensors and a controller. The ultrasonic sensors are arranged at different positions in a horizontal direction of a bumper fixed to a vehicle, respectively. Each of the ultrasonic sensors also has an input and output surface and is configured: to emit ultrasonic waves along a beam axis from the input and output surface in accordance with an output electric signal; and also to receive incoming ultrasonic waves through the input and output surface to convert the incoming ultrasonic waves into an input electric signal. The controller is configured: to supply the output electric signal to each of the ultrasonic sensors; and also to judge whether or not at least one obstacle is present in a maximum detection area covered with the ultrasonic sensors based on at least input electric signals from the ultrasonic sensors. The ultrasonic sensors comprise first and second ultrasonic sensors. Each of the first and second ultrasonic sensors is located at either side of the bumper so that its own beam axis has an angle deflected in a horizontal direction from a surface-normal direction of the bumper and is directed towards an intermediate portion of the bumper.

In an embodiment, individual detection areas of the first and second ultrasonic sensors are overlapped.

In an embodiment, each of the first and second ultrasonic sensors comprises a bezel of which top face is its own input and output surface that is inclined at said angle with respect to a bottom face of the bezel mounted on a surface of the bumper.

In an embodiment, said input and output surface has a first inclination angle with respect to a vehicle width direction, while the bottom face of a corresponding bezel has a second inclination angle with respect to the vehicle width direction. The input and output surface has an inclination angle of the sum of the first and second inclination angles with respect to the bottom face of the corresponding bezel.

In an embodiment, each of the first and second ultrasonic sensors comprises a bezel of which top face is its own input and output surface that is parallel with a bottom face of the bezel mounted on a surface of the bumper. Each beam axis of the first and second ultrasonic sensors is inclined at said angle with respect to a normal line to a corresponding input and output surface.

In an embodiment, the bumper is a front bumper or a rear bumper. The ultrasonic sensors comprise two or three ultrasonic sensors. Each horizontal beam angle of the first and second ultrasonic sensors is set so that each of the first and second ultrasonic sensors has an individual detection area of which detection width is the sum of a vehicle width and a predetermined margin width.

In an embodiment, the ultrasonic sensors comprise two or three ultrasonic sensors. Each horizontal beam angle of the ultrasonic sensors is overlapped with other one or two horizontal beam angles. For example, if the ultrasonic sensors comprise two ultrasonic sensors, each horizontal beam angle of the ultrasonic sensors is overlapped with another horizontal beam angle. In addition, if the ultrasonic sensors comprise three ultrasonic sensors, each horizontal beam angle of the ultrasonic sensors is overlapped with other two horizontal beam angles.

In an embodiment, each vertical beam angle of the first and second ultrasonic sensors is set so that each individual detection area of the first and second ultrasonic sensors is located above a road surface.

In an embodiment, the controller is configured to judge whether or not at least one obstacle is present in the maximum detection area based on first and second self-signals and first and second mutual signals. The first self-signal corresponds to an input electric signal obtained when the first ultrasonic sensor receives ultrasonic waves emitted from the first ultrasonic sensor. The second self-signal corresponds to an input electric signal obtained when the second ultrasonic sensor receives ultrasonic waves emitted from the second ultrasonic sensor. The first mutual signal corresponds to an input electric signal obtained when the second ultrasonic sensor receives ultrasonic waves emitted from the first ultrasonic sensor. The second mutual signal corresponds to an input electric signal obtained when the first ultrasonic sensor receives ultrasonic waves emitted from the second ultrasonic sensor.

In an embodiment, the controller is configured to judge that at least one obstacle is present in a blind spot between the vehicle and the maximum detection area, if a judgment that at least one obstacle is present, a minimum distance apart, in the maximum detection area is obtained and the judgment is then changed to another judgment that the at least one obstacle is not present in the maximum detection area.

In an embodiment, a mutual detection area corresponding to the first and second mutual signals is narrower than each of the individual detection areas corresponding to the first and second self-signals.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
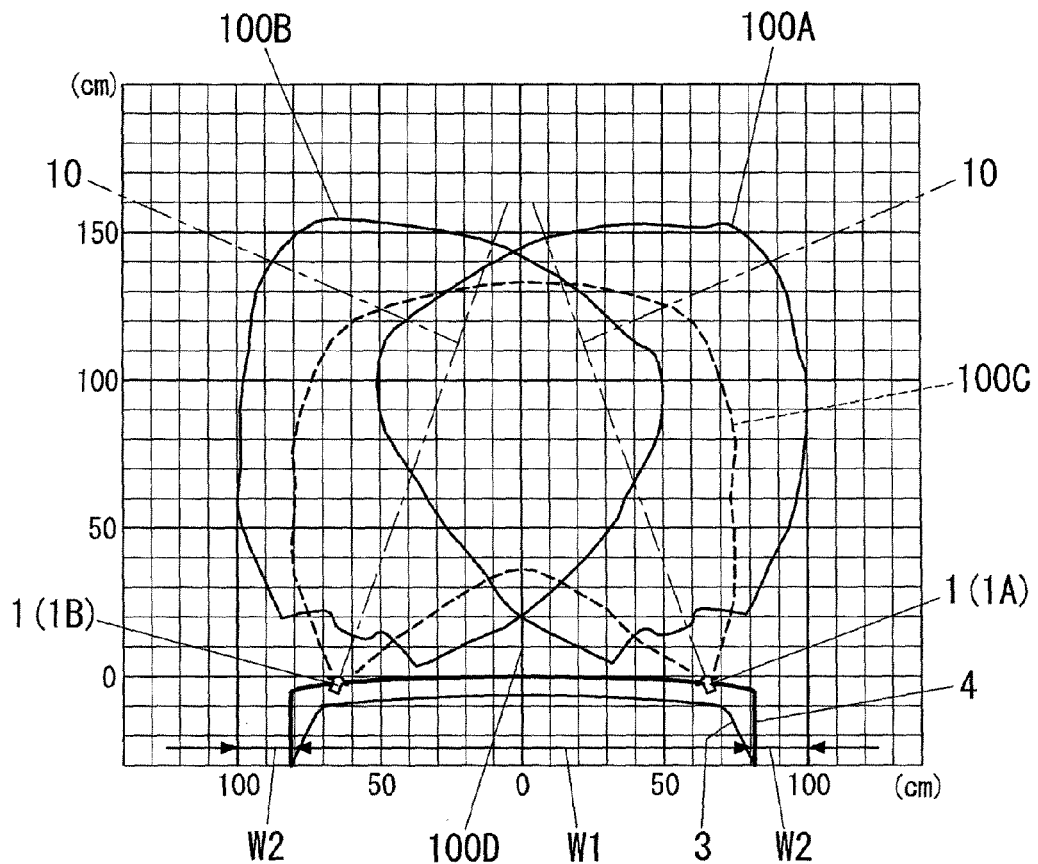
FIG. 1 is a schematic diagram of an obstacle detection system in accordance with an embodiment of the present invention.

FIG. 1 shows an obstacle detection system in accordance with an embodiment of the present invention. The system includes a plurality of ultrasonic sensors 1 and a controller 2. In the embodiment, the plurality of ultrasonic sensors 1 includes first and second ultrasonic sensors 1A and 1B which are each arranged at different positions, in a horizontal direction, of a bumper 4 fixed to a vehicle 3. The bumper 4 is a front bumper or a rear bumper.

Figure 2:
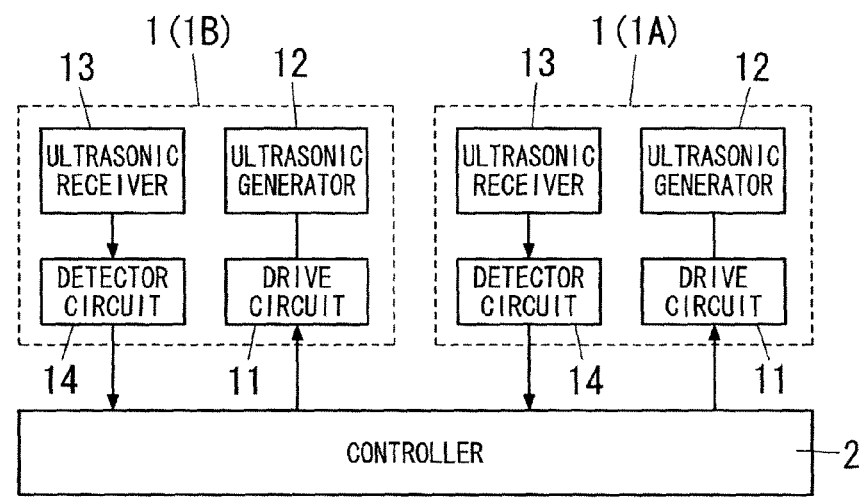
FIG. 2 is a block diagram of the obstacle detection system.
Figure 3:
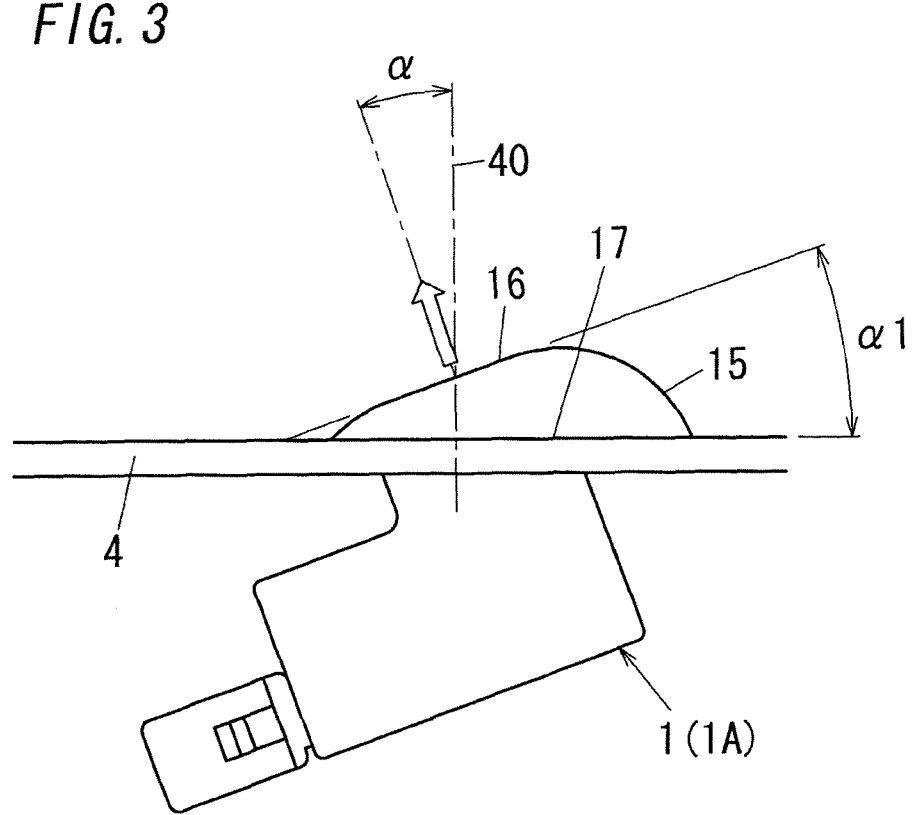
FIG. 3 is a schematic diagram of an ultrasonic sensor in the obstacle detection system.

As shown in FIGS. 2 and 3, each of the ultrasonic sensors 1A and 1B has an input and output face 16 and is configured: to emit ultrasonic waves (ultrasonic pulse burst) along its own beam axis 10 from the input and output face 16 in accordance with an output electric signal from the controller 2; and also to receive incoming ultrasonic waves (incoming ultrasonic pulse burst) through the input and output face 16 to convert the incoming ultrasonic waves into an input electric signal. For example, each of the ultrasonic sensors 1A and 1B includes a drive circuit 11, an ultrasonic generator 12, an ultrasonic receiver 13 and a detector circuit 14.

The drive circuit 11 includes an oscillator, and is configured to produce a drive signal in accordance with an output electric signal from the controller 2 to supply the drive signal to the ultrasonic generator 12, where the drive signal is a signal for generating an ultrasonic pulse burst during a predetermined duration from an oscillation signal of the oscillator. For example, the output electric signal is, but not limited to, a control signal for turning on and off an output of the oscillator. An output electric signal of the present invention may be a digital signal for generating an ultrasonic pulse burst during a predetermined duration. In this instance, for example, the controller 2 may be configured to supply the output electric signal (the digital signal) to the ultrasonic generator 12 through a D/A converter.

An ultrasonic generator 12 has an output plane located in the input and output face 16, and is configured to emit ultrasonic waves along the beam axis 10 from the input and output face 16 in accordance with a drive signal from a drive circuit 11. For example, the ultrasonic generator 12 includes an ultrasonic speaker. In this instance, the input and output face 16 may have one or more holes. The ultrasonic receiver 13 has an input plane located in the input and output face 16, and is configured to receive incoming ultrasonic waves through the input and output face 16 to convert the incoming ultrasonic waves into an input electric signal. For example, the ultrasonic receiver 13 includes an ultrasonic microphone, and the incoming ultrasonic waves are obtained from ultrasonic waves emitted from any of the ultrasonic sensors 1A and 1B. However, the present invention is not limited to this. Each of the first and second ultrasonic sensors of the present invention may be an ultrasonic transmitting and receiving device having an input and output plane (an ultrasonic transceiver such as a piezoelectric device or the like). The ultrasonic transmitting and receiving device is configured: to generate ultrasonic waves along the beam axis from the input and output face in accordance with an output electric signal (i.e., a drive signal obtained from an output electric signal); and also to receive incoming ultrasonic waves through the input and output face to convert the incoming ultrasonic waves into an input electric signal.

The detector circuit 14 is configured to obtain a detection signal from the input electric signal to supply the detection signal to the controller 2. In an example, the detector circuit 14 includes an amplifier circuit for amplifying the input electric signal, and the detection signal is obtained from the amplified signal. For example, the amplified signal is supplied, as the detection signal, to the controller 2 through a comparator, a schmitt trigger, an A/D converter or the like. However, the detector circuit 14 is not limited to this. The detector circuit 14 may be configured in the same way as different receivers each of which is located between an ultrasonic receiver and a controller in a conventional obstacle detection system.

In the embodiment, as shown in FIG. 3, each of the ultrasonic sensors 1A and 1B is located at either side of the bumper 4 so that its own beam axis 10 has an angle α deflected in a horizontal direction from a surface-normal direction 40 of the bumper 4 and is directed towards an intermediate portion of the bumper 4. Specifically, each of the ultrasonic sensors 1A and 1B includes a bezel (or a cover) 15 of which top face is its own input and output face 16 that is inclined at an angle α1 with respect to the bottom face 17 of the bezel 15 mounted on the surface of the bumper 4. The angle α1 equals the angle α, and the angle α may be, but not limited to, in a range of 10-40°. As shown in FIG. 1, individual detection areas 100A and 100B of the ultrasonic sensors 1A and 1B are overlapped (each part of them is covered with each other). In other words, horizontal beam angles of the ultrasonic sensors 1A and 1B are overlapped with each other. In the example of FIG. 1, each width dimension of the individual detection areas 100A and 100B is the sum of a margin width W2 and a width (about 80% of a vehicle width) that is longer than a half of the vehicle width W1 and shorter than the vehicle width W1. A distance between the ultrasonic sensors 1A and 1B is, but not limited to, 130 cm. A distance between the first and second ultrasonic sensors of the present invention may be in a range of 100-170 cm.

The controller 2 is configured: to supply an output electric signal to each of the ultrasonic sensors 1; and also to judge whether or not at least one obstacle is present in a maximum detection area covered through the ultrasonic sensors 1 based on at least input electric signals from the ultrasonic sensors 1 (detection signals obtained from the input electric signals).

For example, the controller 2 includes a microcomputer and is configured to judge whether or not at least one obstacle is present in the maximum detection area based on first and second self-signals and first and second mutual signals. The first self-signal corresponds to an input electric signal obtained when the ultrasonic sensor 1A has received ultrasonic waves emitted from the ultrasonic sensor 1A, and, in the embodiment, is a detection signal from the detector circuit 14 of the ultrasonic sensor 1A. The second self-signal corresponds to an input electric signal obtained when the ultrasonic sensor 1B has received ultrasonic waves emitted from the ultrasonic sensor 1B, and is a detection signal from the detector circuit 14 of the ultrasonic sensor 1B. The first mutual signal corresponds to an input electric signal obtained when the ultrasonic sensor 1B has received ultrasonic waves emitted from the ultrasonic sensor 1A, and is a detection signal from the detector circuit 14 of the ultrasonic sensor 1B. The second mutual signal corresponds to an input electric signal obtained when the ultrasonic sensor 1A has received ultrasonic waves emitted from the ultrasonic sensor 1B, and, in the embodiment, is a detection signal from the detector circuit 14 of the ultrasonic sensor 1A.

In FIG. 1, the individual detection areas 100A and 100B correspond to the first and second self-signals, respectively. The mutual detection area 100C corresponds to the first and second mutual signals. The maximum detection area is defined by the individual detection areas 100A and 100B and the mutual detection area 100C. In an example, the mutual detection area 100C may be narrower than each of the individual detection areas 100A and 100B, and the relationship can be defined by first and second minimum time and first and second maximum time to be described.

Specifically, the controller 2 includes, but not limited to, first and second timer functions (not shown). The controller of the present invention may include a single timer function. For example, the controller 2 activates the first and second timer functions while at the same time supplying an output electric signal to the ultrasonic sensor 1A. The controller 2 then starts receiving a detection signal from the ultrasonic sensor 1A if a measurement time of the first timer function reaches a first minimum time, and also starts receiving a detection signal from the ultrasonic sensor 1B if a measurement time of the second timer function reaches a second minimum time. Accordingly, a near end of the individual detection area 100A is defined by the first minimum time, and a near end of a side of the ultrasonic sensor 1A in the mutual detection area 100C is defined by the second minimum time. The first and second minimum time may be the same as or different from each other. The duration for an ultrasonic pulse burst is set to a shorter time than each of the first and second minimum time.

The controller 2 then obtains both measurement times from the first and second timer functions if obtaining a first self-signal and a first mutual signal from the ultrasonic sensors 1A and 1B, respectively. The controller 2 then judges whether or not at least one obstacle is present in the individual detection area 100A based on a measurement time of the first timer function (a flight time). For example, it is possible to judge that at least one obstacle is present in the individual detection area 100A if the first self-signal contains a component corresponding to the ultrasonic waves (the ultrasonic pulse burst). A distance from the obstacle can be also measured by using the flight time. The controller 2 also judges whether or not at least one obstacle is present in the mutual detection area 100C based on a measurement time of the second timer function. For example, it is possible to judge that at least one obstacle is present in the mutual detection area 100C if the first mutual signal contains a component corresponding to the ultrasonic waves. A distance from the obstacle can be also measured by using the measurement time of the second timer function. If the distance from the obstacle is not required, both flight times by the first and second timer functions are unnecessary.

The controller 2 then stops receiving a detection signal from the ultrasonic sensor 1A if the measurement time of the first timer function reaches a first maximum time, and also stops receiving a detection signal from the ultrasonic sensor 1B if the measurement time of the second timer function reaches a second maximum time. Accordingly, a far end of the individual detection area 100A is defined by the first maximum time, and a far end of the mutual detection area 100C is defined by the second maximum time. The first and second maximum time may be the same as or different from each other.

Similarly, the controller 2 activates the first and second timer functions while at the same time supplying an output electric signal to the ultrasonic sensor 1B. The controller 2 then starts receiving a detection signal from the ultrasonic sensor 1B if a measurement time of the first timer function reaches a first minimum time, and also starts receiving a detection signal from the ultrasonic sensor 1A if a measurement time of the second timer function reaches a second minimum time. Accordingly, a near end of the individual detection area 100B is defined by the first minimum time, and a near end of a side of the ultrasonic sensor 1B in the mutual detection area 100C is defined by the second minimum time. The first and second minimum time may be the same as or different from each other.

The controller 2 then obtains both measurement times from the first and second timer functions if obtaining a second self-signal and a second mutual signal from the ultrasonic sensors 1B and 1A, respectively. The controller 2 then judges whether or not at least one obstacle is present in the individual detection area 100B based on a measurement time of the first timer function. The controller 2 also judges whether or not at least one obstacle is present in the mutual detection area 100C based on a measurement time of the second timer function.

The controller 2 then stops receiving a detection signal from the ultrasonic sensor 1B if the measurement time of the first timer function reaches a first maximum time, and also stops receiving a detection signal from the ultrasonic sensor 1A if the measurement time of the second timer function reaches a second maximum time. Accordingly, a far end of the individual detection area 100B is defined by the first maximum time, and a far end of the mutual detection area 100C is defined by the second maximum time. The first and second maximum time may be the same as or different from each other.

The controller 2 is also configured to judge that at least one obstacle is present in a blind spot 100D between the vehicle 3 and the maximum detection area if a judgment that at least one obstacle is present, a minimum distance apart, in the maximum detection area is obtained and the judgment is then changed to another judgment that the at least one obstacle is not present in the maximum detection area. In this instance, the obstacle detection system shows that at least one obstacle is present in the blind spot 100D by a warning means (e.g., an alarm or the like). Accordingly, it is possible to notify a user (a driver) that at least one obstacle is present in a blind spot 100D before the vehicle is moved.

In the present embodiment, each of the ultrasonic sensors 1A and 1B is located at either side of the bumper 4 so that its own beam axis 10 has an angle α1 deflected in a horizontal direction from a surface-normal direction 40 of the bumper 4 and is directed towards the intermediate portion of the bumper 4. Accordingly, the periphery of the bumper 4 can be covered with the ultrasonic sensors 1A and 1B, and the number of the ultrasonic sensors can be decreased. In the example of FIG. 1, the individual detection areas 100A and 100B of the ultrasonic sensors 1A and 1B are overlapped and two margin widths W2 are provided, and it is accordingly possible to cover an area (a maximum detection area) of the sum of the vehicle width W1 and an area twice the margin width W2.

Figure 4:
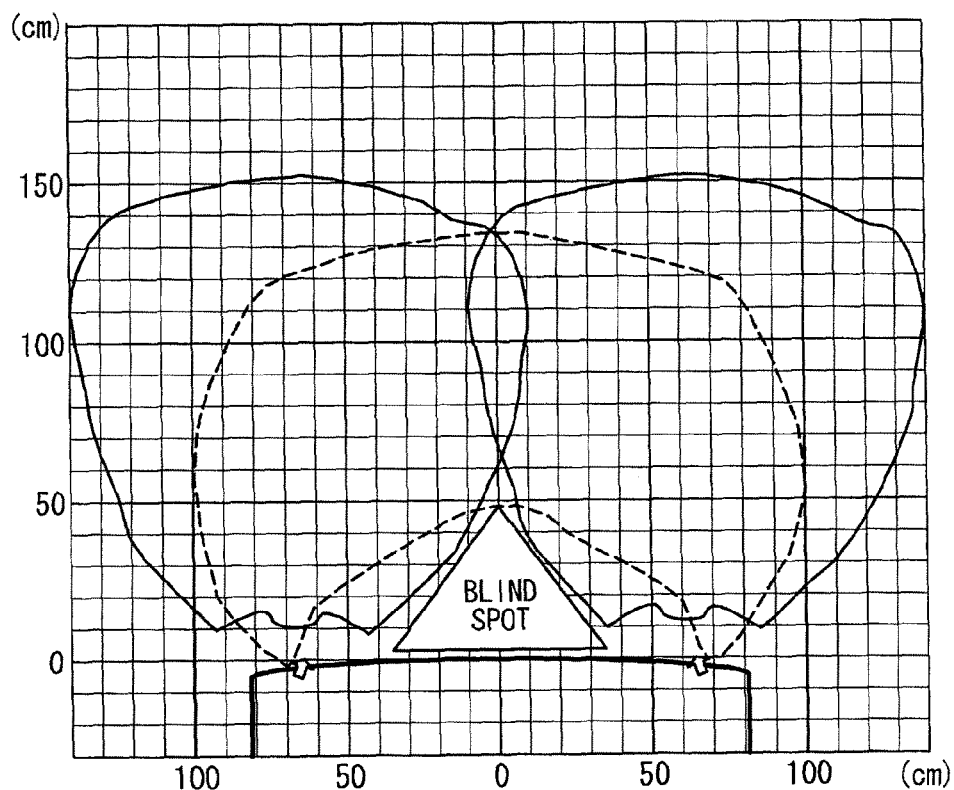
FIG. 4 is a schematic diagram of a comparative example in which each beam axis of ultrasonic sensors coincides with a surface-normal direction of the bumper.

Even if the ultrasonic sensors 1A and 1B are ultrasonic sensors of which blind spot is large when their beam axes agree with surface-normal directions of the bumper as shown in FIG. 4, the blind spot 100D can be reduced as shown in FIG. 1 by setting a deflected angle α. Therefore, selection freedom of ultrasonic sensors can be increased, and each beam angle of the ultrasonic sensors 1A and 1B can be suitably set.

Figure 5:
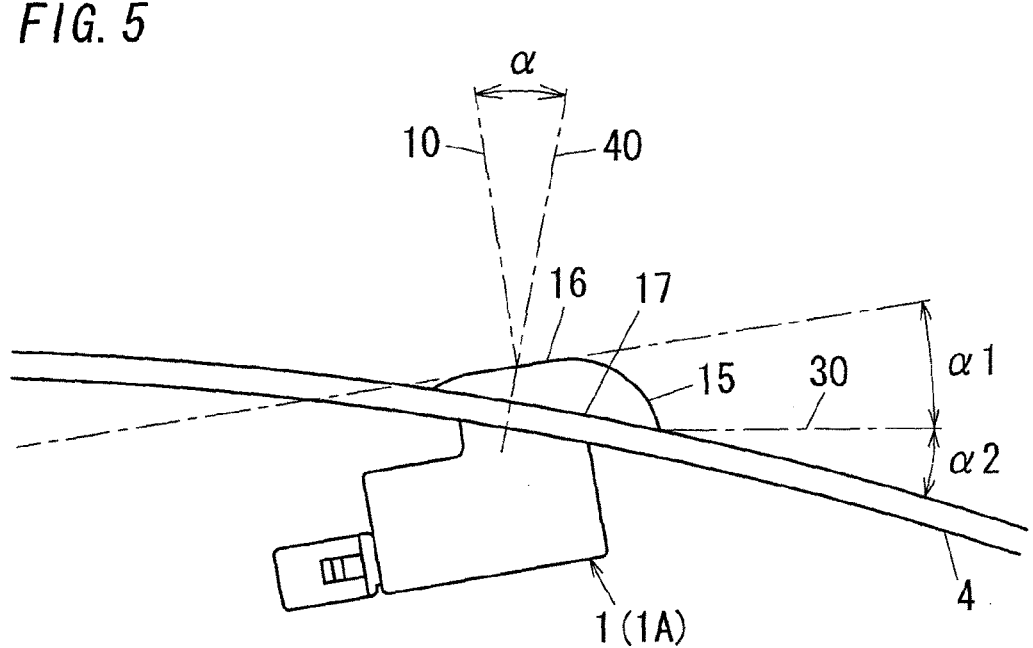
FIG. 5 is a schematic diagram of an ultrasonic sensor of an obstacle detection system in an embodiment.

In an embodiment, as shown in FIG. 5, each input and output face 16 of the ultrasonic sensors 1A and 1B has a first inclination angle α1 with respect to a vehicle width direction 30, while the bottom face 17 of a corresponding bezel 15 has a second inclination angle α2 with respect to the vehicle width direction 30. Each input and output face 16 has an inclination angle α of the sum of the first and second inclination angles (α1+α2) with respect to the bottom face 17 of a corresponding bezel 15. That is, each beam axis 10 coincides with a surface-normal direction of the input and output face 16 of a corresponding bezel 15, and has an angle α deflected in a horizontal direction from a surface-normal direction 40 of the bumper 4. The angle α can be set based on α (=α1) of FIG. 3, and an angle caused by R of the bumper 4 with respect to left-right direction of a vehicle (i.e., α2).

Figure 6:
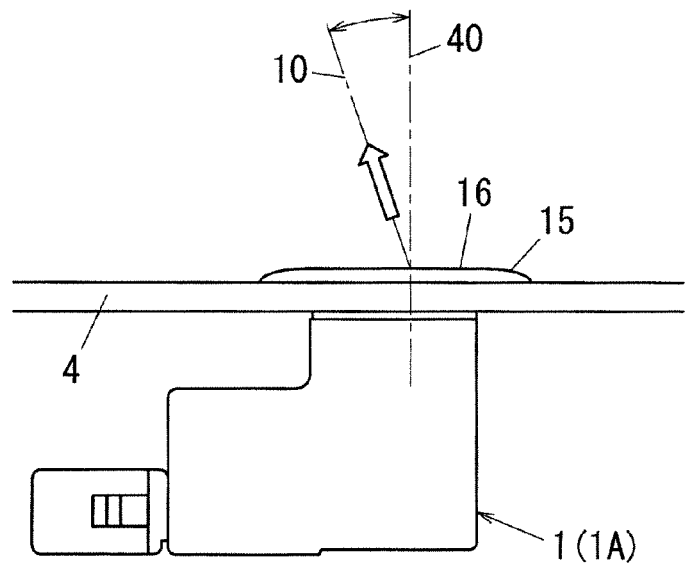
FIG. 6 is a schematic diagram of an ultrasonic sensor of an obstacle detection system in an embodiment.

In an embodiment, as shown in FIG. 6, a top face of the bezel 15 of the ultrasonic sensor 1A is the input and output face 16 of the ultrasonic sensor 1A, and the input and output face 16 is parallel with the bottom face 17 of the bezel 15 mounted on the surface of the bumper 4. Similarly, a top face of the bezel 15 of the ultrasonic sensor 1B is the input and output face 16 of the ultrasonic sensor 1B, and the input and output face 16 is parallel with the bottom face 17 of the bezel 15 mounted on the surface of the bumper 4. Each beam axis 10 of the ultrasonic sensors 1A and 1B is inclined at an angle α (a deflected angle) with respect to a surface-normal direction 40 of a corresponding input and output face 16. For example, an ultrasonic sensor 1 as shown in FIG. 6 can be obtained by being provided with a directional characteristic in which the beam axis of the ultrasonic generator 12 is inclined at an angle α with respect to a surface-normal direction 40 of the input and output face 16 of the bezel 15.

In an example, the bezel 15 has the input and output face 16 at the front, and has a recess including a flat bottom (not shown) at the rear. The ultrasonic generator 12 includes, e.g., an oscillating body (not shown) that is mounted on the flat bottom in the recess of the bezel 15. In addition, the flat bottom in the recess includes cuts (e.g., terraced cuts) at either side of the oscillating body. For example, it is possible to incline the beam axis 10 of the ultrasonic sensor 1(1A) as shown in FIG. 6 by forming the terraced cuts at a center side of the bumper 4 with respect to the oscillating body, where the terraced cuts becomes deeper with increasing distance from the oscillating body. However, the ultrasonic generator is not limited to this. The ultrasonic generator 12 may be fixed in a body of an ultrasonic sensor so that the beam axis of the ultrasonic generator 12 is inclined at an angle α with respect to a normal line 40 to the input and output face 16 of the bezel 15. A conventional ultrasonic generator having a directional characteristic of an inclined angle α may be used.

Figure 7:
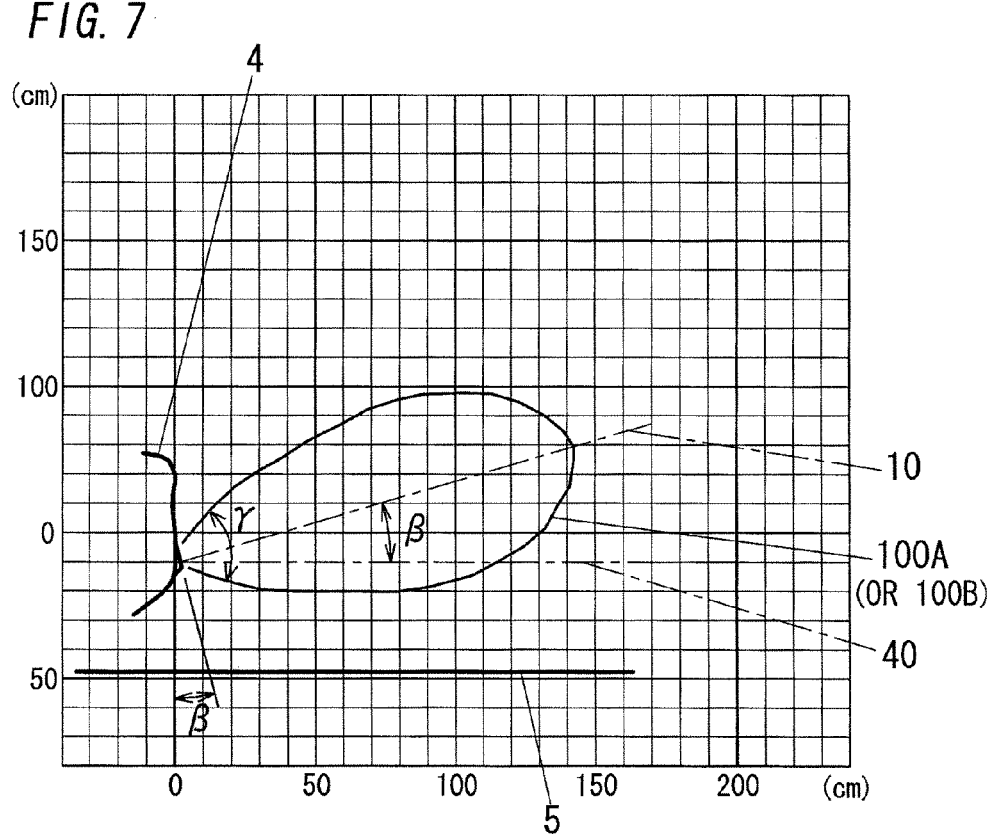
FIG. 7 is a schematic diagram of an ultrasonic sensor's vertical beam angle of an obstacle detection system in an embodiment.

In an embodiment, as shown in FIG. 7, each of the ultrasonic sensors 1A and 1B is placed at either side of the bumper 4 so that its own beam axis 10 has an angle β deflected in a vertical direction from a surface-normal direction 40 of the bumper 4 and is directed upward. Specifically, each vertical beam angle γ of the ultrasonic sensors 1A and 1B is set so that the individual detection areas 100A and 100B of the ultrasonic sensors 1A and 1B each are arranged above the road surface 5. This leads to prevent a false detection caused by a small projection of the road surface 5, or the like.

In an embodiment, each horizontal beam angle of the ultrasonic sensors 1A and 1B is set so that each of the ultrasonic sensors 1A and 1B has an individual detection area of which detection width is the sum of the vehicle width W1 and a predetermined margin width W2.

Although the present invention has been described with reference to certain preferred embodiments, numerous modifications and variations can be made by those skilled in the art without departing from the true spirit and scope of this invention, namely claims.

For example, each obstacle detection system in the aforementioned embodiments may include three ultrasonic sensors 1, and each horizontal beam angle of the ultrasonic sensors 1 may be overlapped with other two horizontal beam angles. For example, a third ultrasonic sensor 1 has a beam axis including a horizontal component that is parallel with a surface-normal direction of the bumper 4 (a front-back direction of the vehicle) like FIG. 4. The controller 2 activates a (first, second or third) timer function while at the same time supplies an output electric signal to the third ultrasonic sensor. The controller 2 starts receiving a detection signal from the third ultrasonic sensor if a measurement time of the timer function reaches a third minimum time. Accordingly, a near end of the individual detection area of the third ultrasonic sensor is defined by the third minimum time. The third minimum time may be the same as or different from the first and second minimum times. The controller 2 then obtains a measurement time from the timer function if obtaining a third self-signal from the third ultrasonic sensor. The controller 2 then judges whether or not at least one obstacle is present in the individual detection area based on the measurement time of the timer function. The controller 2 stops receiving a detection signal from the third ultrasonic sensor if the measurement time of the timer function reaches a third maximum time. Accordingly, a far end of the individual detection area by the third ultrasonic sensor is defined by the third maximum time. The third maximum time may be the same as or different from the first and second maximum times. In this example, the blind spot can be eliminated.

The invention claimed is:

1. An obstacle detection system, comprising:
ultrasonic sensors arranged at different positions in a horizontal direction of a bumper fixed to a vehicle, respectively, each of the ultrasonic sensors having an input and output surface and being configured: to emit ultrasonic waves along a beam axis from the input and output surface in accordance with an output electric signal; and also to receive incoming ultrasonic waves through the input and output surface to convert the incoming ultrasonic waves into an input electric signal; and a controller configured: to supply the output electric signal to each of the ultrasonic sensors; and also to judge whether or not at least one obstacle is present in a maximum detection area based on at least input electric signals from the ultrasonic sensors, said maximum detection area being covered with the ultrasonic sensors, wherein the ultrasonic sensors comprise first and second ultrasonic sensors each of which is located at either side of the bumper so that its own beam axis has an angle deflected in a horizontal direction from a surface-normal direction of the bumper and is directed towards an intermediate portion of the bumper, and the controller is configured to judge whether or not at least one obstacle is present in the maximum detection area based on first and second self-signals and first and second mutual signals, the first self-signal corresponding to an input electric signal obtained when the first ultrasonic sensor receives ultrasonic waves emitted from the first ultrasonic sensor, the second self-signal corresponding to an input electric signal obtained when the second ultrasonic sensor receives ultrasonic waves emitted from the second ultrasonic sensor, the first mutual signal corresponding to an input electric signal obtained when the second ultrasonic sensor receives ultrasonic waves emitted from the first ultrasonic sensor, and the second mutual signal corresponding to an input electric signal obtained when the first ultrasonic sensor receives ultrasonic waves emitted from the second ultrasonic sensor.

2. The obstacle detection system of claim 1, wherein individual detection areas of the first and second ultrasonic sensors are overlapped.

3. The obstacle detection system of claim 2, wherein each of the first and second ultrasonic sensors comprises a bezel, a top face of the bezel being the input and output surface, the input and output surface being inclined at said angle with respect to a bottom face of the bezel mounted on a surface of the bumper.

4. The obstacle detection system of claim 3,
wherein said input and output surface has a first inclination angle with respect to a vehicle width direction, while the bottom face of a corresponding bezel has a second inclination angle with respect to the vehicle width direction,
the input and output surface having an inclination angle of the sum of the first and second inclination angles with respect to the bottom face of the corresponding bezel.

5. The obstacle detection system of claim 2,
wherein each of the first and second ultrasonic sensors comprises a bezel of which top face is its own input and output surface that is parallel with a bottom face of the bezel mounted on a surface of the bumper, and
wherein each beam axis of the first and second ultrasonic sensors is inclined at said angle with respect to a normal line to a corresponding input and output surface.

6. The obstacle detection system of claim 2, wherein the controller is configured to judge that at least one obstacle is present in a blind spot between the vehicle and the maximum detection area,
if a judgment that at least one obstacle is present, a minimum distance apart, in the maximum detection area is obtained and the judgment is then changed to another judgment that the at least one obstacle is not present in the maximum detection area.

7. The obstacle detection system of claim 2, wherein a mutual detection area corresponding to the first and second mutual signals is narrower than each of the individual detection areas corresponding to the first and second self-signals.

8. The obstacle detection system of claim 1, wherein each of the first and second ultrasonic sensors comprises a bezel, a top face of the bezel being the input and output surface, the input and output surface being inclined at said angle with respect to a bottom face of the bezel mounted on a surface of the bumper.

9. The obstacle detection system of claim 8,
wherein said input and output surface has a first inclination angle with respect to a vehicle width direction, while the bottom face of a corresponding bezel has a second inclination angle with respect to the vehicle width direction,
the input and output surface having an inclination angle of the sum of the first and second inclination angles with respect to the bottom face of the corresponding bezel.

10. The obstacle detection system of claim 1,
wherein each of the first and second ultrasonic sensors comprises a bezel of which top face is its own input and output surface that is parallel with a bottom face of the bezel mounted on a surface of the bumper, and
wherein each beam axis of the first and second ultrasonic sensors is inclined at said angle with respect to a normal line to a corresponding input and output surface.

11. The obstacle detection system of claim 1,
wherein the bumper is a front bumper or a rear bumper,
wherein the ultrasonic sensors comprise two or three ultrasonic sensors, and
wherein each horizontal beam angle of the first and second ultrasonic sensors is set so that each of the first and second ultrasonic sensors has an individual detection area of which detection width is the sum of a vehicle width and a predetermined margin width.

12. The obstacle detection system of claim 1,
wherein the ultrasonic sensors comprise two or three ultrasonic sensors, and
wherein each horizontal beam angle of the ultrasonic sensors is overlapped with other one or two horizontal beam angles.

13. The obstacle detection system of claim 1, wherein each vertical beam angle of the first and second ultrasonic sensors is set so that each individual detection area of the first and second ultrasonic sensors is located above a road surface.

14. The obstacle detection system of claim 1, wherein the controller is configured to judge that at least one obstacle is present in a blind spot between the vehicle and the maximum detection area,
if a judgment that at least one obstacle is present, a minimum distance apart, in the maximum detection area is obtained and the judgment is then changed to another judgment that the at least one obstacle is not present in the maximum detection area.

15. The obstacle detection system of claim 1, wherein a mutual detection area corresponding to the first and second mutual signals is narrower than each of the individual detection areas corresponding to the first and second self-signals.

* * * * *